(No Model.) 5 Sheets—Sheet 1.
P. J. LANDIN.
CASH INDICATOR, REGISTER, AND RECORDER.
No. 482,014. Patented Sept. 6, 1892.
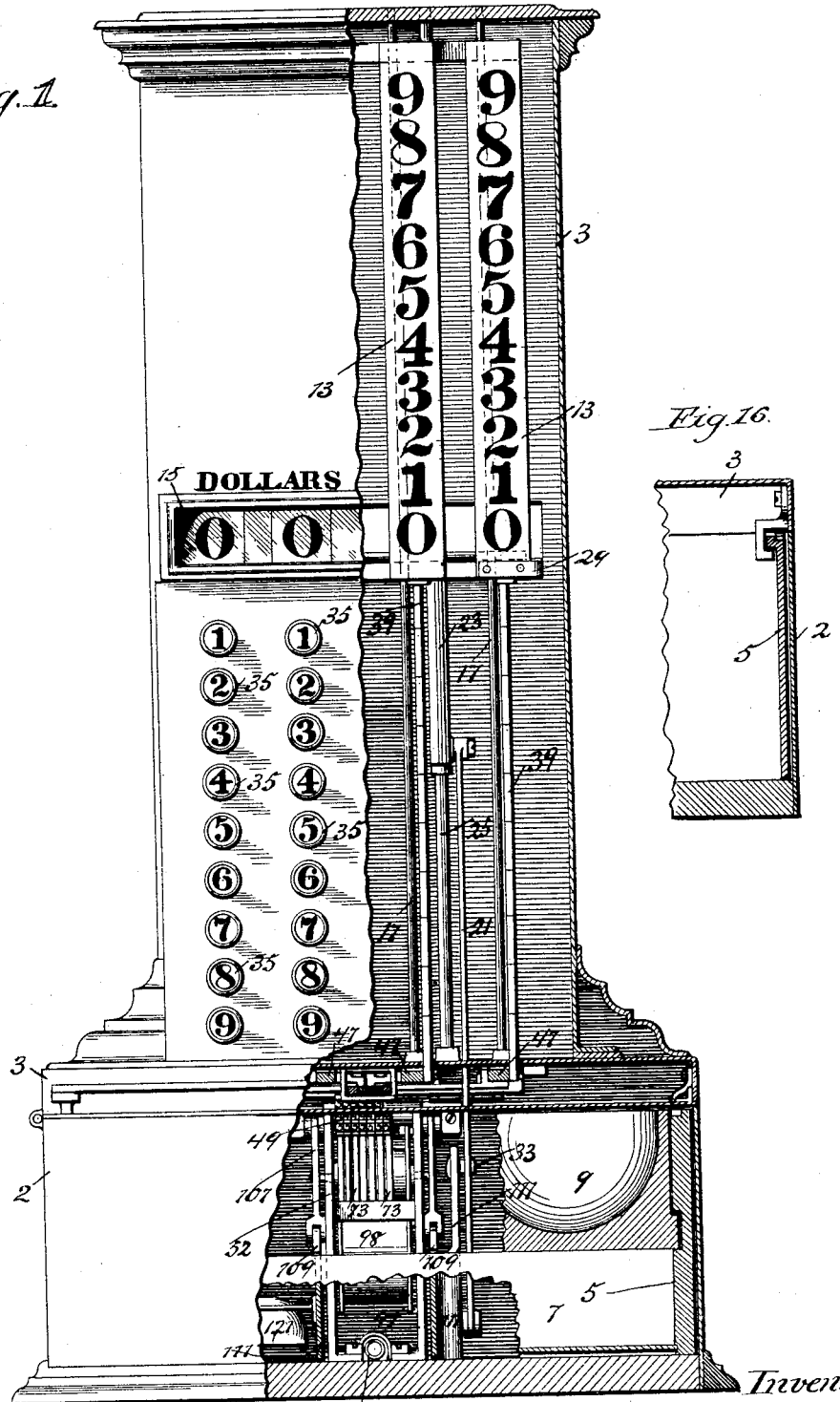

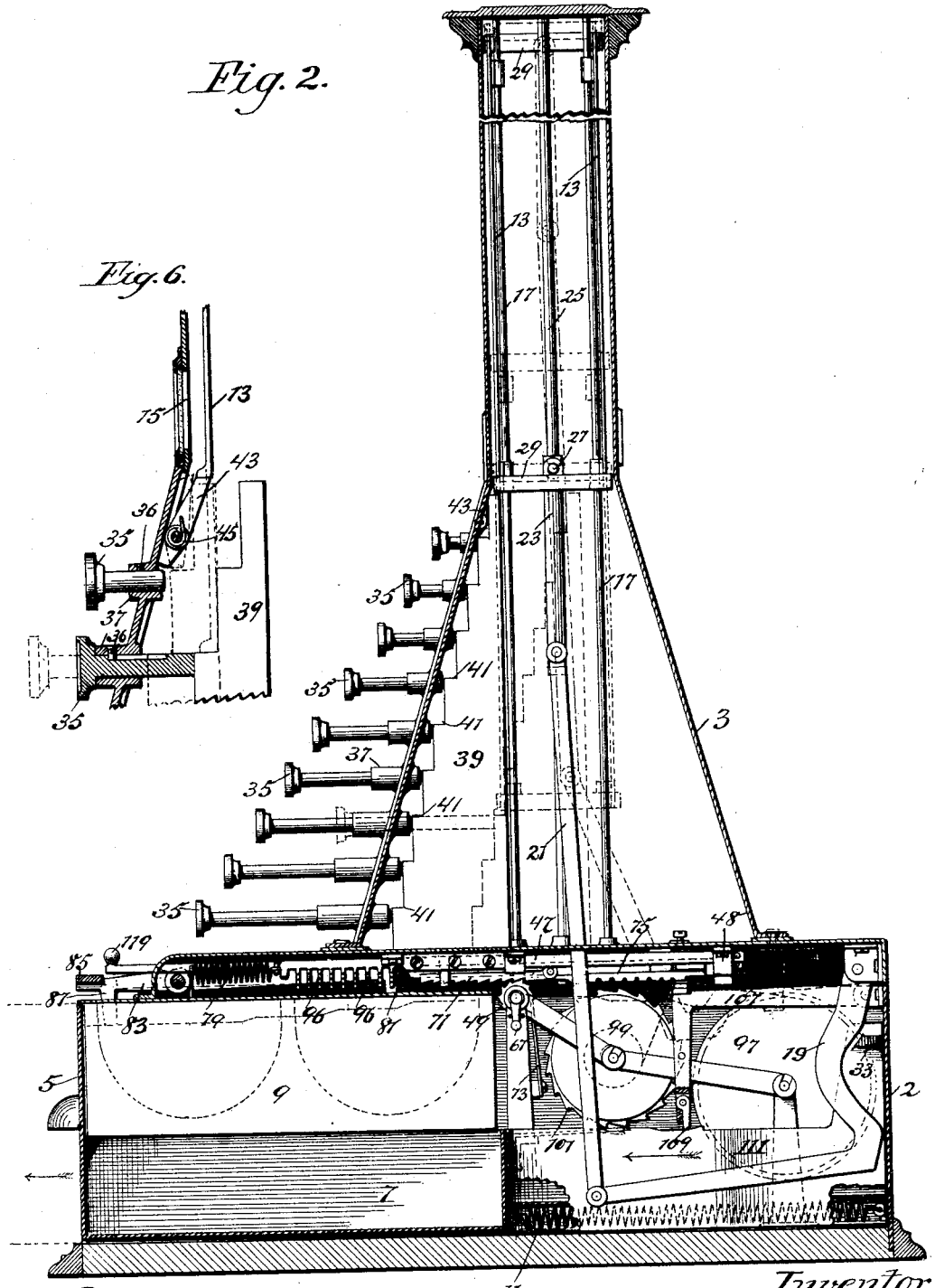

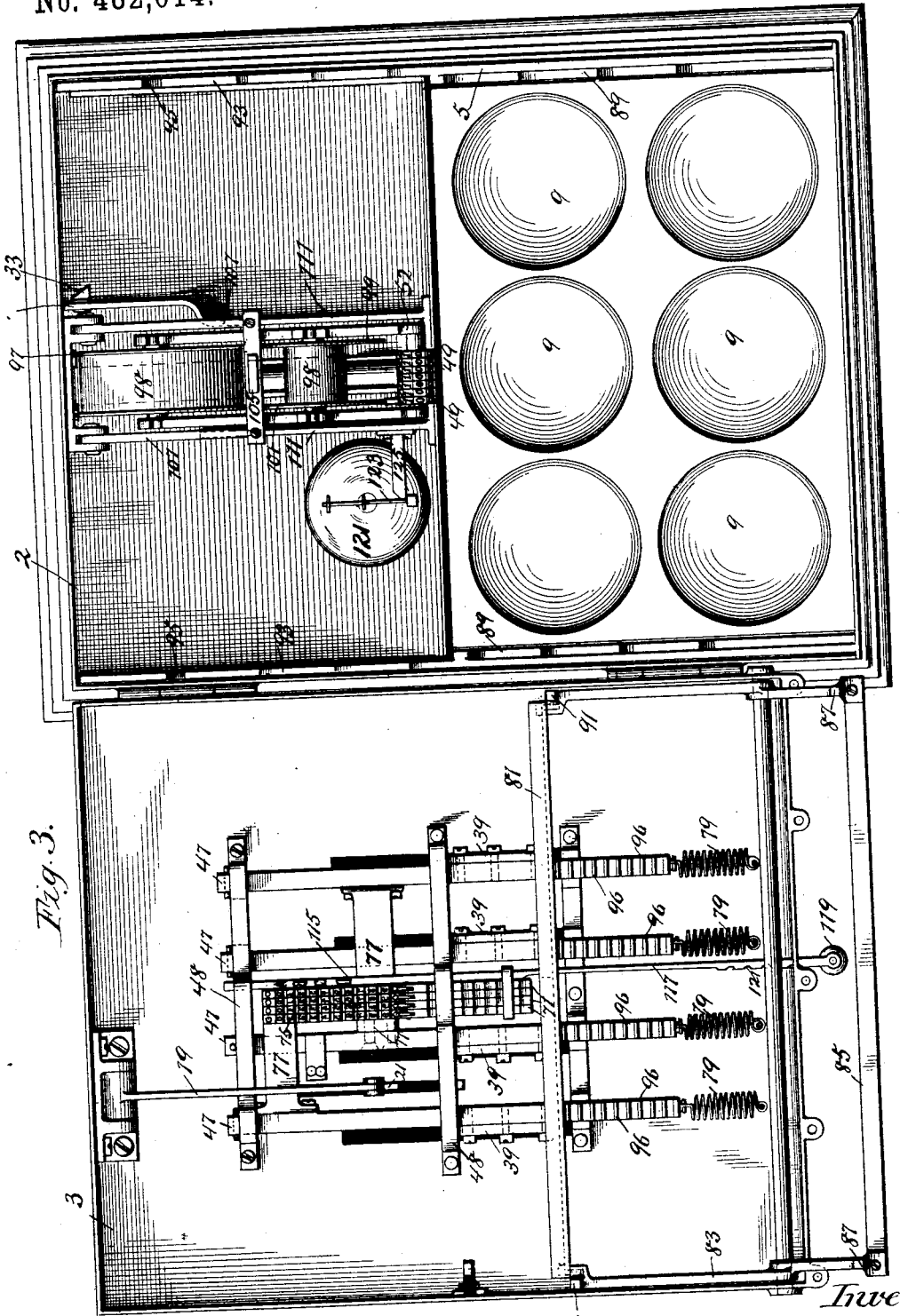

(No Model.) 5 Sheets—Sheet 4.
P. J. LANDIN.
CASH INDICATOR, REGISTER, AND RECORDER.
No. 482,014. Patented Sept. 6, 1892.
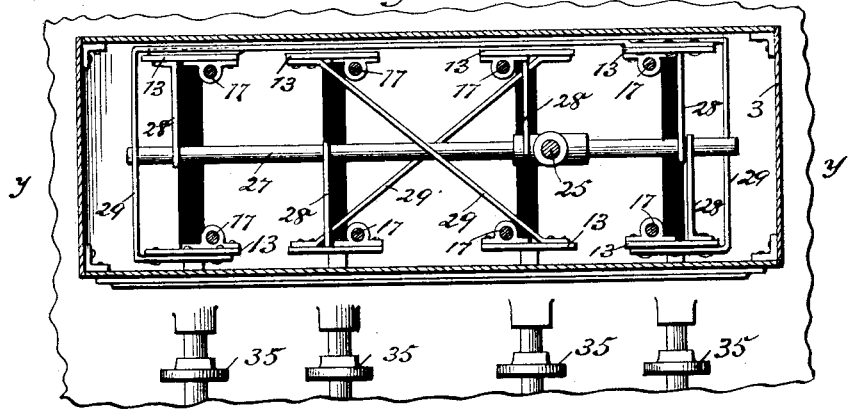
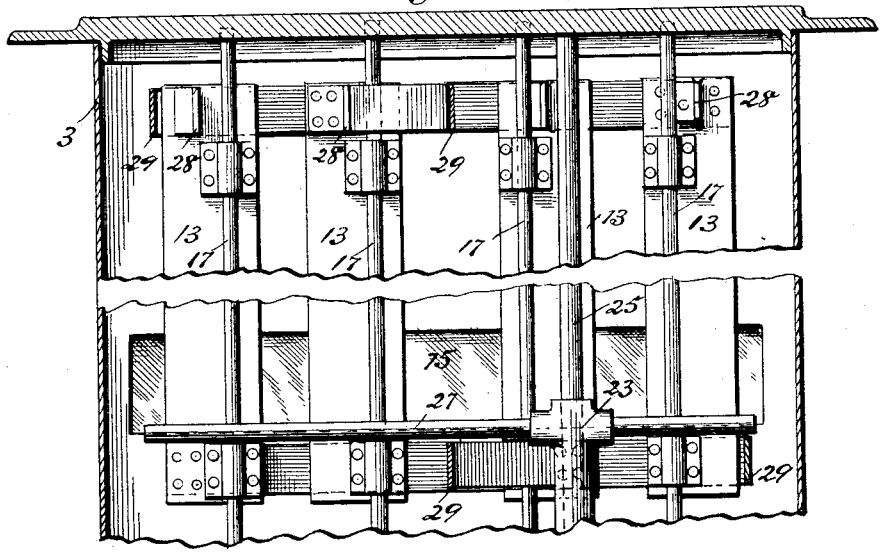
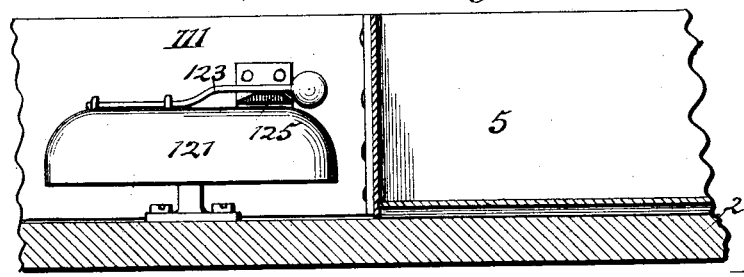
Witnesses:
J. Jessen
O. E. Van Doren
Inventor:
Peter J. Landin
By Paul & Mann Att'ys (No Model.)  
5 Sheets—Sheet 5.
P. J. LANDIN.
CASH INDICATOR, REGISTER, AND RECORDER.
No. 482,014.  
Patented Sept. 6, 1892.
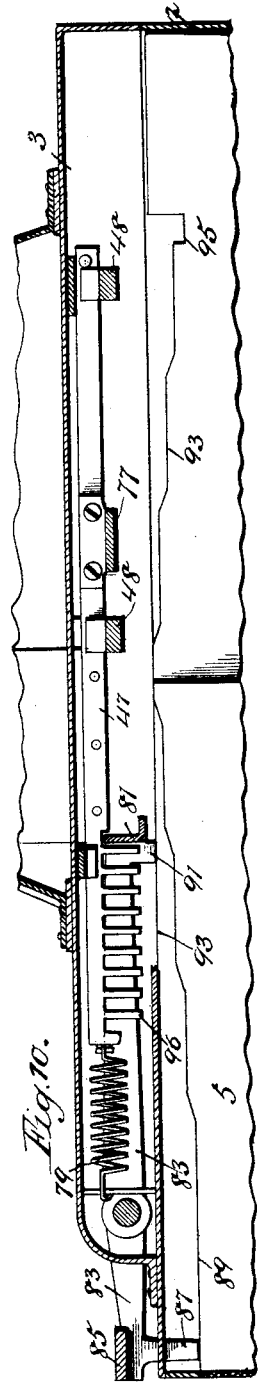
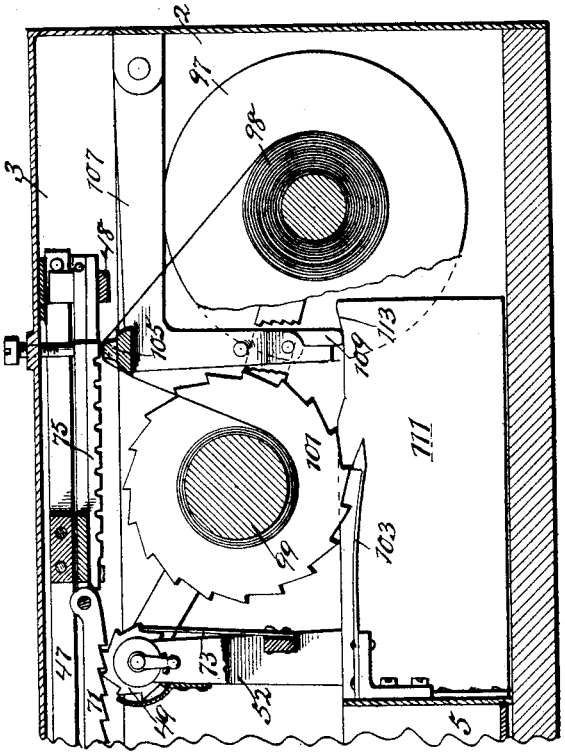
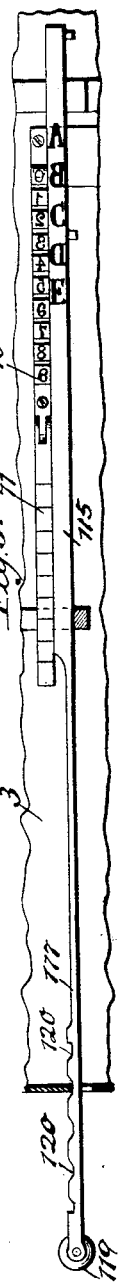
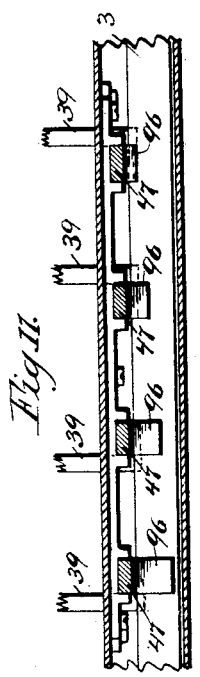
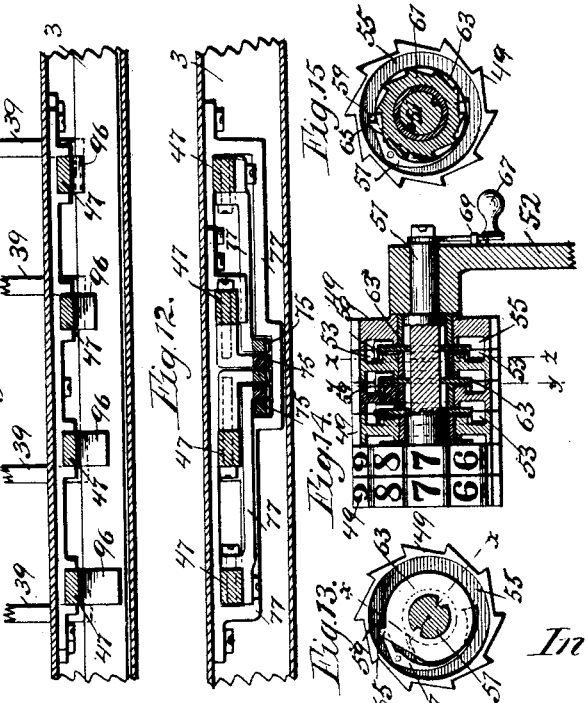
Witnesses  
J. Jessen  
C. E. Van Doren
Inventor  
Peter J. Landin  
By Paul Mannin Att'ys

UNITED STATES PATENT OFFICE.

PETER J. LANDIN, OF MINNEAPOLIS, MINNESOTA.

CASH INDICATOR, REGISTER, AND RECORDER.

SPECIFICATION forming part of Letters Patent No. 482,014, dated September 6, 1892.

Application filed September 19, 1890. Serial No. 365,522. (No model.)

*To all whom it may concern:*

Be it known that I, PETER J. LANDIN, of Minneapolis, in the county of Hennepin and State of Minnesota, have invented a new and useful Cash Indicator, Register, and Recorder, of which the following is a specification.

This invention relates to mechanisms designed for indicating, registering, and recording the amounts of cash sales; and the objects I have in view are, first, to provide a machine in which the amount of each sale will be indicated, so as to be seen both by the seller and the purchaser, the amount of the sale will be registered on a mechanism that carries or registers the total of the sales, and a permanent record of each sale will be made; second, to provide a machine in which sales of any amount from one cent up to one hundred dollars may be indicated, registered, and recorded; third, to provide a machine in which the keys or slides may be operated all together or singly in any order; fourth, to provide a machine in which any one or every record may be given a distinguishing mark for the purpose of denoting the salesman making it or for designating it as a debit or credit, or for any other purpose; fifth, to provide a machine with which it is impossible to make an incorrect record or registration, and, sixth, to provide a machine that consists of but few parts and is simple in construction and easy in operation.

Other objects of the invention will appear from the following detailed description, taken in connection with the accompanying drawings, in which—

Figure 1 is a front elevation of my improved machine with a portion of the casing broken away to show the interior mechanism. Fig. 2 is a vertical transverse section of the same. Fig. 3 is a plan view showing the top of the lower case and the bottom of the upper case, which is represented as turned over to show its under side. Figs. 4 and 5 are details of the upper portions of the casing, showing particularly the drops or slides of the indicating mechanism. Fig. 6 is a detail showing the means for holding the drops when they are in their elevated position or set at zero. Fig. 7 is a detail of a portion of the drawer, showing, also, the bell and the means for operating it. Figs. 8 and 9 are details of the printing or recording mechanism. Fig. 10 is a detail showing the top of the money-drawer, the upper part of the lower case, and the lower part of the upper case, and showing, also, the means for locking the bars and releasing them in order. Figs. 11, 12, 13, 14, and 15 are details of the registering mechanism, Fig. 13 being a section on line $y\,y$ of Fig. 14, and Fig. 14 being a section on line $x\,x$ of Fig. 13, and Fig. 15 being a section on line $z\,z$ of Fig. 14. Fig. 16 is a detail.

In this machine three distinct operations are performed—first, the indicating of the amount of the sale or transaction; second, the registering of this amount on the register, which keeps the total of the transaction and by which such total can at any time be ascertained, and, third, the printing or marking of the amount of each transaction upon a strip of paper or other suitable material, and when desired giving to each record a distinguishing mark.

In the machine I have herein shown and described the cash-drawer must first be opened. Then either before or after making change the proper keys may be pressed and the amount of the sale or transaction will be shown by the indicating mechanism. The movement of the keys will also move the registering and recording bars or slides the proper distance; but neither the registering nor the recording devices are operated to register or record the amount until the next time the drawer is opened. After the keys are pressed and the amount of the sale or transaction is shown on the indicator the drawer is released and returned to its closed position. When the drawer is next opened, it completes the operation of registering and recording the amount of the preceding transaction.

In the drawings, 2 represents the lower case, which contains the cash-drawer, the registering mechanism, and the rolls upon which the recording-paper is wound, and 3 represents the upper case, preferably hinged to the lower at one side thereof and containing the indicating mechanism and the means for operating the registering and recording mechanisms. The cash-drawer 5 slides in the lower casing and preferably occupies the forward or front portion thereof. It is preferably provided with the lower compartment 7, adapted to hold bank notes or bills, and the upper sliding tray 9 provided with coin-receptacles. The cash-drawer is connected to the casing by a suitable spring 11, which shuts the drawer when it is released and holds it in its closed position. In the upper part of the upper casing is arranged a series of slides or drops 13, and this casing is provided with an opening 15 in its wall, preferably one in front and one in the rear, which may be covered with glass, and through which opening one figure upon each slide is visible.

I have shown in this machine two sets of slides or drops, one at the front and one at the rear of the case, each set consisting of four slides. The two right-hand slides of each set are used for indicating cents and the two left-hand slides for dollars. It will thus be seen that with a machine having four slides in each set I may indicate any amount up to and including ninety-nine dollars and ninety-nine cents, or one cent less than one hundred dollars. By adding one more slide I may indicate any amount up to one thousand dollars, and so on, and while I have shown and described herein a machine provided with four slides I do not wish to be limited to any particular number of slides, as it is evident that a greater or less number may be used. These slides are preferably supported upon vertical guide-rods 17, and when they are unsupported they drop down into the lower part of the upper case, as indicated by dotted lines in Fig. 2. I provide means by which when the cash-drawer is drawn out all of these slides are raised and set at zero. In this position they are supported until the keys are operated and then they drop down, so as to indicate the amount of the sale or transaction.

For the purpose of raising the slide I prefer to employ the following-described means: A bell-crank lever 19 is pivoted in the lower part of the upper case 3 and projects into the lower case in the rear of the money-drawer, as shown in Fig. 2. This lever is connected by an arm 21 with a tubular bar 23, that is arranged to slide upon a fixed rod or support 25. The tube 23 has secured to it a laterally-projecting rod 27. I prefer, also, to connect the slides 13 of the two sets in pairs, so that when one slide in any set is allowed to drop the corresponding slide of the other set moves with it. The slides may be connected in any suitable manner, preferably by the bars 29. Two of these bars may be arranged at the tops of the slides, as shown in Figs. 4 and 5, while the others are arranged at the bottoms of the slides. I also secure arms 28 to these slides near their upper ends, and these arms project toward the center of the casing, as shown in Fig. 4. These arms may be omitted from those slides which have the bars 29 connected to their upper portions and extending from them directly across the casing. It will be seen that with this arrangement as the tubular slide 23 is raised the rod or cross-bar 27 engages all of the slides and raises them into the top of the case, causing them to slide on the supporting-rod 17. By this means all of the slides will be raised so that the zero-marks thereon will be opposite the openings in the wall of the case.

Secured to the rear of the money-drawer is a projecting spring-plate 111, having upon one side the catch or lug 33. When the drawer is closed and the lever 19 is down, as shown in Fig. 2, this lug stands in the rear of said lever 19. When the drawer is pulled out, this lug engages the lever and turns it on its pivot from the position shown in full lines in Fig. 2 to the position indicated by dotted lines in the same figure. This raises the slides, and after they are raised and the drawer has been pulled clear open the lever 19 drops back to its original position. When the drawer is closed, the plate 111 springs or yields sufficiently to permit the lug 33 to pass the lever 19.

Arranged in the front of the casing is a bank of keys 35, consisting of as many separate series of keys, marked with numerals from "1" to "9," as there are slides in the machine. These keys are preferably arranged as shown in Figs. 1 and 2, and the shanks or stems of the keys are of different lengths, as shown in Fig. 2. The keys are preferably supported in sockets 37 and they may be secured therein by set-screws 36 in said socket engaging a groove in the stem of the key.

Arranged within the casing in front of each series of keys is a sliding plate 39. These plates are secured to the bars of the registering and recording mechanism, as hereinafter described, and their front edges are arranged on an incline, which may be formed into a series of steps 41, as shown in Fig. 2. It will be noticed that as the keys are of different lengths the amount that the sliding plate would be moved when any key is operated will depend upon the number of the key. For instance, as here shown, the operation of the key numbered "1" would move the slide the shortest distance, that of the key numbered "2" a little farther, and so on throughout the series. I also provide means by which the slides 13 are held in their raised position after they have been lifted by the means hereinbefore described until it is necessary for them to drop again to indicate another transaction. For this purpose I arrange beneath each slide 13 a dog 43, provided with a spring 45, which tends to throw the upper end of the dog beneath the lower end of the slide 13, as shown in Fig. 6. When the slides are raised, the sliding plates 39, that have been moved in the last preceding operation of the machine, will be in the position in which they are left by such operation, and when the slides 13 are brought to the top of the casing the spring-dogs 43 will engage them and hold them in this position, while the lever 19 and the devices connected to it drop back into their normal position. Then when the sliding plates 39 are returned to their normal position, which is that indicated by full lines in Fig. 2 and by dotted lines in Fig. 6, they will engage and throw back the dogs 43, and the slides 13 will then drop down a little farther and rest on the tops of the sliding plates 39. In this position the indicating part of the mechanism is set at zero and is ready for the next operation. When the key required in either series is pushed in, the sliding plates 39 will be moved a corresponding distance and the corresponding slide or drop 13 will then drop down until it rests on the forward inclined edge or step of the sliding plate 39, and the distance that the slide 13 will be permitted to move will be just sufficient to expose the figure on that plate corresponding to the figure on the key that is operated. For example, if key numbered "2" is operated, as indicated in Fig. 6, the corresponding slide 13 will drop down until its lower end strikes the step or inclined edge of the plate 39, and the figure on the slide 13 will then be exposed at the opening in the casing. The slides 13, after they have been dropped in the manner described, will remain in this position, locking the plates 39 also in the position that they have been brought into until the slides 13 are again raised and set at zero by the opening of the cash-drawer in the manner described. The sliding plates 39 are, as before stated, connected to the sliding bars or mechanism by which the registering and recording devices are operated. As shown in the drawings, the plates 39 are connected to movable bars 47, arranged in the lower part of the upper case 3 and arranged to move or slide in suitable bearings or supports 48.

The registering mechanism consists, preferably, of a series of ratchet-wheels 49, mounted upon a shaft 51, arranged in a suitable bearing or standard 52 in the lower casing 2. The wheels 49 are each preferably provided with ten teeth or notches numbered from "1" to "0," and the wheels are preferably so arranged that each wheel may be turned independently of the preceding wheel; but when each wheel has made a complete revolution the succeeding wheel will be turned one step. By this means the wheel at the right, being the units-wheel preferably, the device may be used for adding or making a total registration of independent amounts or transactions. It will be understood that any desired number of these wheels may be used. I have here shown six wheels, which will permit the registration of any amount up to one thousand dollars. I prefer to construct each wheel 49 with a groove 53 upon its side and each wheel 49 with a corresponding groove 55 upon its opposite side. Pivoted in the groove 55 is a spring-dog 57, provided with a lug or finger 59, that projects laterally into the groove 53 in the next wheel. Each wheel after the first is also provided with the interior ratchet 61. A disk 63 is splined upon the shaft 51 between each pair of wheels. The periphery of this disk is engaged by the lateral projection 59 on the spring-dog 57, and the projection 59 is thereby held out of engagement with the ratchet 61, except at one point on the disk 63, where it is cut away to permit the projection 59 to engage the tooth of the ratchet-wheel for the purpose of advancing the succeeding wheel one notch or step. The projection 59 then passes over a spur 65 on the disk 63, which disengages it from the ratchet 61. The shaft 51 is preferably provided with a handle 67, normally held in position by the movable pins 69. By removing these pins and turning the shaft 51 the lugs 65 on the disk 63 will engage the projections 59 on the spring-pawls 57 and turn all of the registering-wheels to zero. This will be done when the machine is to be reset to begin a new registration.

The registering-wheels are operated by a series of movable bars 71, said bars being provided with ratchet-notches corresponding to the notches upon the wheels 49. The wheels 49 are prevented from moving backward by means of suitable spring-dogs 73. When the bars 71 are moved in one direction, they pass over the wheels 49 without moving them, and when they move in the opposite direction they engage said wheels and turn them. The distance that said bars 71 are moved in one direction determines the amount of their reverse movement, and consequently the movement of the registering-wheels. The bars 71 are pivotally connected to the bars 75, that are rigidly secured to the sliding bars 47 by suitable means, as by the connecting-bars 77. This pivotal connection of the bars 71 permits these bars to rise as they pass in one direction over the wheels 49. The slides or bars 47, to which, as before stated, the plates 39 are connected, are each provided with a spring 79, which tends to retract them or return them to their normal position after each operation. When, therefore, the keys are pushed in in the manner already explained, it will be seen that the notched bars of the registering mechanism will be moved a corresponding distance, and when the sliding plates 39 and the bars 47 are released the springs 79 return the sliding plates 39, the bars 47, the bars 75, and the bars 71 to their normal position, and when this reverse movement of these parts takes place the registering-wheels will be turned by the bars 71 a sufficient distance to register the amount denoted by the key that has been operated and indicated by the slide or drop released by the movement of said key. As before stated, these movable parts or slides are moved inward by the operation of the appropriate key or keys, and, as before stated, they are released and returned to their normal position by the springs 79 the next time that the cash-drawer is opened, being locked or held in the positions to which they are moved by the keys by the engagement of the drops or slides 13 with the inclined or stepped edge of the sliding plates 39, and, as before stated, these slides remain down until they are raised by the lever 19 in the opening of the cash-drawer. As before stated, it is immaterial in what order the sliding keys are operated; but it is important or desirable that the return movement of these sliding bars or members should take place in a certain order, the units-bar returning first and the others in succession thereafter. By this means the registering mechanism will be operated in the proper order, the units-wheel being turned first and the other wheels in the proper sequence. When this is done, the amounts will be properly carried from one wheel to the next throughout the series. To accomplish this, I prefer to employ the following-described construction: A cross-bar 81 is arranged above the cash-drawer and beneath the bars 47. This bar is secured to a pivoted frame 83, having a cross-bar 85 at the front of the machine, as shown in Figs. 2 and 10. This frame is also provided at its sides, and preferably at the front of the machine, with the depending lugs or projections 87, that rest upon the surface 89, that is formed upon or secured to the sides of the drawer. This surface 89 is formed in steps, as shown in Fig. 10. The frame 83 is also provided at or near its rear end with depending lugs 91, and these lugs rest upon the surface 93, also secured to or formed upon the upper edges of the drawer. The rear portion of the surface 93 is also formed in steps, and at its rear end is a notch 95. The surfaces 89 and 93 and the lugs 87 and 91 are so arranged in relation to each other that the lug 87 at all times bears upon the surface 89 and the lug 91 upon the surface 93, except when the lug 91 is in engagement with the notch 95, and then the lug 87 will be free from the surface 89. As the drawer is opened, the lug 87 slides over the surface 89, the lug 91 at the same time sliding over the surface 93. When the lug 87 passes onto the first step in the surface 89, the lug 91 passes down the first step in the surface 93, and thereby the bar 81 is lowered. This bar is again lowered where the lug 91 passes onto the second step, and again lowered where it passes onto the third step, and again where it passes into the notch 95. The bars 47 are each provided with a series of depending lugs or projections 96, which form spaces between which the cross-bar 81 extends when this bar is raised to its highest position. The projections 96 are shortest on the units-bar and progressively longer on the other bars, so that when the drawer is opened and the lugs 91 drop onto the first step in the surface 93 the bar 81 will pass below the lugs 95 on the units-bar, and this bar will then be released and free to be returned to its normal position by the spring 79. As the lugs 91 pass onto the second step the second bar 47 will be released, and so until the drawer has been entirely opened and the lugs 91 have dropped into the notch 95, in which position they will hold the drawer open. As the bars 47 are successively released they will be returned to their normal position and the ratchet-bars 75, connected with them, will engage with and operate the wheels of the registering mechanism. As the units-bar is first released, the units-wheel will first be operated and the others in succession thereafter. By this means the amount of any transaction that has been indicated by the indicating mechanism already described will at the next time the drawer is opened be registered upon the registering mechanism and the total amount registered thereon may at any time be ascertained.

The means which I prefer to use for making a permanent record of each transaction is as follows: Arranged in the lower part of the case is a drum or wheel 97, upon which is wound a strip of paper or other suitable material 98. This material as it is unwound from the drum 97 is wound upon a drum 99, having secured thereto a ratchet-wheel 101. A spring-dog 103 is secured to the cash-drawer and engages the ratchet-wheel 101 and each time that the drawer is opened turns this drum 99 a distance equal to the length of one notch of the ratchet-wheel, thereby winding the paper or ribbon from the drum 97 onto the drum 99. The paper or ribbon 98 as it passes from one drum to the other passes over a block 105, which may be formed of any suitable material. As here shown, I have formed this block of rubber. This block is secured upon a bell-crank lever 107, pivoted to the casing and provided at its lower end with pivoted tongues 109, that rest upon the upper surface of plates 111, secured to the cash-drawer. The plates 111 are provided with the incline 113, upon which the tongues 109 rest, so that as the drawer is opened the levers 107 are raised, while as the drawer is closed the tongues 109 turn in the opposite direction, and therefore do not raise the levers. The bars 75 are provided with a series of figures or letters, and when the bars are pushed in by the operation of the keys hereinbefore described the figure on the bar 75 corresponding to the key that has been operated will come into a position directly over the block 105. Then when the drawer is opened the block 105 will be raised, so as to press the paper or ribbon against the figure on the bar 75, and thereby a permanent print or impression of said figure will be made upon said paper. This movement of the block 105 will carry the paper against all of the bars 75 and the record made thereon will be that of the preceding sale or transaction.

In some instances it is desirable to put a distinguishing mark by the record of each transaction for the purpose of denoting the clerk or salesman by whom the sale is made, or for denoting whether the transaction is a credit or debit one, or for some other purpose. I therefore prefer to provide a sliding bar 115, having upon its under surface a series of letters or characters and arranged alongside of the bars 75. This bar has a spring-handle 117 extending through the front of the upper part of the casing and preferably provided with a knob 119. The spring-handle passes through a slot in the casing and is provided with a series of notches 120, any one of which may be engaged by the wall of the casing at the side of the slot, thereby locking the bar in any position in which it may be set. The handle will be provided with corresponding letters or characters upon its upper surface, so that the position to which the bar is to be moved may be readily determined. When any record is to be made with the machine, this bar will be moved so as to bring the letter or character that is to be added to the record into position where it will show just outside of the wall of the casing. Then the corresponding letter or character on the bar 115 will be in position to be impressed upon the paper when the drawer is opened.

A bell will preferably be arranged to be sounded when the drawer is opened. Any suitable bell may be used. That which I have shown consists of a gong 121, provided with a spring-tongue 123. Arranged in the lower part of the casing a lug 125, having beveled or inclined edges, is secured to the plate 111. When the drawer is closed, this projection passes under the tongue and raises it from the ground. When the drawer is opened, the tongue is released and strikes upon the gong.

It will be readily seen that many changes or variations in the arrangement and construction of the machine may be made without departing from my invention, and I do not therefore wish to be confined to the details of the construction or arrangement herein shown and described.

The operation of the machine is as follows: If, for example, it is desired to make a record of a sale amounting to "$19.31," the cash-drawer will first be opened, thereby the indicating mechanism will be reset at zero, and the amounts of the previous transaction will be registered and recorded. Then either before or after making the change the proper keys will be pushed in, these keys in this instance being the key numbered "1" in the right-hand series, the key numbered "3" in the second series, the key numbered "9" in the third series, and the key numbered "4" in the fourth or left-hand series. It will be immaterial in what order the keys are operated. As each key is operated the appropriate slide drops down and exposes the figure corresponding to this key. As each key is moved in it also moves the operating-bar of the registering mechanism and also the figure or type-bar of the recording mechanism. As the indicating-slides drop down they engage and lock the sliding plates 39 in the position into which they are moved by the keys. This also locks the bars of the registering and recording mechanisms in the positions to which they have been moved. After the change has been made the cross-bar 85 is touched, thereby releasing the drawer, which is then closed by the spring. When the drawer closes, the cross-bar 81 engages all of the bars 47. The parts then remain in the position that they are now in until the cash-drawer is again opened. When this is done, the indicating-slides are again reset at zero, releasing the sliding plates 39, the paper or ribbon is raised to make a record or impression of the previous transaction, and the bars of the registering mechanism are then successively released, and they, together with the sliding plates 39 and the bars of the recording mechanism, are returned to their normal position, and thereby the amount of the preceding transaction is registered by the registering mechanism.

It will be noted that the machine is compact, that its parts are easily accessible, that it is extremely simple in construction, and that it is absolutely accurate and reliable, and that it is impossible to make a false record or "beat the machine."

I claim as my invention—

1. In an indicator, the combination, with a series of slides or drops provided with numbers or characters, of a series of keys for each of said slides, means for supporting said slides in any position in which they may be, and means for moving said support and thereby permitting said slides to drop a sufficient distance only to expose the number or character corresponding to the key that is operated, and means for locking each of said keys in the position to which it has been moved.

2. In an indicator, the combination, with a series of slides or drops, of a series of keys for each of said slides and a series of sliding plates upon which said slides are adapted to be supported and arranged to be controlled by said keys, whereby upon the operation of any key in a series the sliding plate will be moved a sufficient distance to permit the corresponding slide to drop and expose the number or character corresponding to that of the key that is operated.

3. In a cash-indicator, the combination, with a series of slides, each provided with numbers or figures, of a series of sliding plates having inclined or step edges and upon which said slides are adapted to be supported, and a series of keys for each of said sliding plates, adapted to move said plates different distances, whereby upon the operation of any one of said keys the corresponding sliding plate will be moved and the corresponding slide will be permitted to drop and rest upon said plate and expose the number or figure corresponding to the key that is operated.

4. In a cash-indicator, the combination, with a movable drop or slide provided with a series of numbers or figures, of a sliding plate provided with an inclined or stepped edge and supporting said slide and a series of keys by any one of which said sliding plate may be moved.

5. In a cash-indicator, the combination, with the slides or drops 13, each provided with a series of figures, of means for simultaneously raising said slides, means for holding them in their raised position, a series of keys for each slide, and means arranged to be moved by said keys and controlling said slides and adapted to permit said slides to move either simultaneously or one at a time, and means for arresting each slide when it has moved a sufficient distance to expose the character represented by the key that is operated, substantially as described.

6. In a cash-indicator, the combination, with a suitable case, of a series of slides provided with figures or characters, means for setting said slides, the sliding plates 39, and the series of keys for each of said slides adapted to move said sliding plates and thereby to permit said slides to move a sufficient distance to expose a character or figure corresponding to that of the key that is operated.

7. In a cash-indicator, the combination, with a suitable case and a money-drawer, of a series of drops or slides, each provided with a series of figures or numbers, means operated by said money-drawer for setting said slides at zero, a series of keys for each slide, and means controlled by said keys whereby upon the operation of any key the corresponding slide will be moved a sufficient distance to expose the number or character represented by the key that is operated.

8. In a cash-register, the combination, with a series of registering-wheels, of a series of movable bars for operating said wheels, means for moving said bars in any order in the direction in which they do not operate the wheels, and means for causing said bars to be operated successively in the direction in which they operate the registering-wheels.

9. In a cash-register, the combination of the registering mechanism, a series of operating-keys, a series of drops or slides arranged to be operated by said keys, a series of movable bars also operated by said keys, and means for causing the wheels of said registering mechanism to be operated by said movable bars in succession when said slides or drops are reset at zero.

10. In a cash-register, the combination, with a series of registering ratchet-wheels, of a series of movable ratchet-bars, each provided with a series of teeth and adapted to pass said ratchet-wheels without turning them when moving in one direction and to turn said wheels when moving in the opposite direction, the number of teeth on said bars corresponding to the number of teeth on said wheels, a series of keys for moving each bar in the direction in which it does not move said wheels, said keys being arranged to move said bars different distances, the distance that each bar is moved by any key corresponding to the number of the key, and means for reversing the movement of said bars after they have been moved by said keys and thereby turning said wheels to correspond to the movement of said bars.

11. In a cash-register, the combination, with the cash-drawer, of the registering-wheels 49, the movable bars 71, adapted to operate said wheels, the series of keys for each bar, and means for locking said bars in the positions into which they are moved.

12. In a cash-register, the combination, with the cash-drawer, of the registering-wheels 49, the movable bars 71, adapted to operate said wheels, keys for moving said bars, and a locking device for holding said bars in the position into which they are moved by said keys and releasing them in succession upon the opening of the cash-drawer.

13. In a cash-indicator, the combination, with the registering mechanism, of the cash-drawer provided with the stepped surfaces 89 and 93 and the pivoted frame having bearings upon said surfaces and arranged to engage the bars that operate the registering mechanism when the drawer is closed and to release them in succession when the drawer is opened.

14. In a cash-register, the combination, with the registering-wheels, of the sliding bars 71, the sliding bars 47, connected therewith and provided with the projections 96, the series of keys for each wheel, the pivoted frame engaging the projections on the bars 47, and the sliding drawer provided with the stepped surfaces 89 and 93 and controlling said frame.

15. In a cash-register, the combination, with the sliding bars, of the series of wheels 49, provided with the ratchet-teeth 61, the spring-dogs 57, the shaft 51, the disk 63, secured to said shaft and arranged between said wheels and adapted to hold said dogs 57 out of engagement with the ratchet 61 except at one point in the movement of the wheel, and means for successively operating said sliding bars.

16. In a cash indicator and register, the combination of a cash-drawer, a registering mechanism, a series of drops or slides, each provided with a series of numbers or characters, a series of numbered keys for each slide, and mechanism connecting said devices whereby upon the opening of the cash-drawer the slides are set at zero and the preceding sale or transaction is registered and upon operating the keys in any order the slides are moved to show the number represented by the keys that are operated and the registering mechanism is set to register these numbers at the next opening of the cash-drawer.

17. In a cash indicator, register, and recorder, the combination of a cash-drawer, a recording mechanism, a registering mechanism, a series of drops or slides, each provided with a series of numbers, a series of numbered keys for each slide, and mechanism connecting said devices whereby upon the opening of the cash-drawer the preceding transaction is recorded and registered and the indicating-slides are set at zero and upon the operating of said keys simultaneously or in any order the slides are moved to show the numbers represented by the keys that are operated and the registering and recording mechanisms are set to register and record these amounts at the next opening of the cash-drawer.

18. In a cash-register, the combination of a cash-drawer, a registering mechanism provided with a series of wheels, a series of numbered keys for each wheel, and mechanism connecting said devices whereby upon the opening of the cash-drawer the preceding transaction is registered and upon operating said keys simultaneously or in any order the registering mechanism is set to register upon the next opening of the cash-drawer the amount represented by the numbers of the keys that are operated.

In testimony whereof I have hereunto set my hand this 5th day of September, 1890.

PETER J. LANDIN.

In presence of—
  FLETCHER L. WALKER,
  C. G. HAWLEY.